United States Patent [19]

Fredericks

[11] Patent Number: 5,337,082
[45] Date of Patent: Aug. 9, 1994

[54] TRAFFIC MANAGEMENT SYSTEM

[75] Inventor: Thomas M. Fredericks, Westbrook, Conn.

[73] Assignee: Whelen Technologies, Inc., Chester, Conn.

[21] Appl. No.: 986,996

[22] Filed: Dec. 7, 1992

[51] Int. Cl.⁵ ............................................. G01S 13/91
[52] U.S. Cl. .................... 342/69; 342/114; 342/28; 342/456
[58] Field of Search .............. 342/69, 114, 28, 456

[56] References Cited

U.S. PATENT DOCUMENTS

| | | | |
|---|---|---|---|
| 3,182,312 | 5/1965 | Daniels | 342/69 |
| 3,268,863 | 8/1966 | Odion et al. | 342/69 X |
| 3,457,546 | 7/1969 | Preti | 342/69 X |
| 3,836,965 | 9/1974 | Preti | 342/69 X |
| 3,978,481 | 8/1976 | Angwin et al. | 342/59 |
| 4,985,705 | 1/1991 | Stammler | 342/69 |

*Primary Examiner*—John B. Sotomayor
*Attorney, Agent, or Firm*—Chilton, Alix & Van Kirk

[57] ABSTRACT

A method of and apparatus for providing information which may be used in making traffic management decisions for limited access highways is disclosed. The method and apparatus employs microwave radar to obtain information bearing signals which are processed to determine the vehicle direction and speed. The apparatus includes the capability of emulating in-the-road or on-the-road sensors to provide output pulse pairs which appear as if generated by switch closures. The method and apparatus also has the capability of providing "wake-up" signals commensurate with a predetermined number of consecutive vehicles which pass a preselected point traveling at an abnormally low speed. Because the method and apparatus are vehicle direction sensitive, the capability of monitoring traffic flow by looking across lanes is also present.

17 Claims, 7 Drawing Sheets

FREQUENCY CHECK

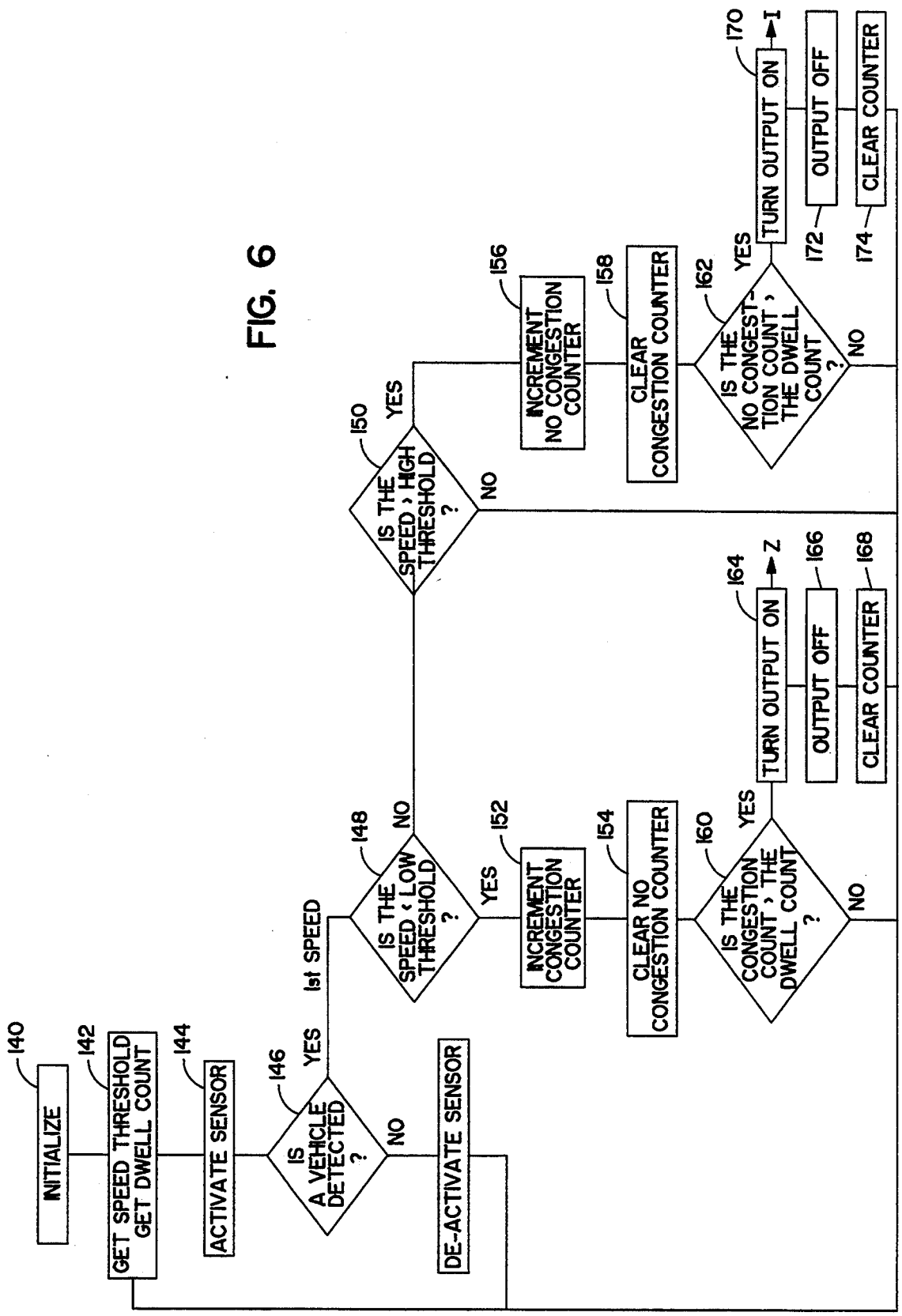

TRAFFIC MANAGEMENT SYSTEM

BACKGROUND OF THE INVENTION

1. Field of the Invention

The present invention relates to the monitoring of vehicular traffic and particularly to the provision of signals commensurate with traffic flow through a region of interest of a multi-lane highway. More specifically, this invention is directed to apparatus for detecting the presence, direction of motion and speed of vehicles passing through a precisely defined space and especially to apparatus for providing traffic condition information which does not require the installation of sensor elements in or on the pavement along which the traffic of interest is moving. Accordingly, the general objects of the invention are to provide novel and improved methods and apparatus of such character.

2. Description of the Prior Art

The automated communication of information commensurate with traffic conditions in real time to a central location, to thereby enable traffic control management decisions to be made and implemented, is becoming of increasing importance. Changes in average traffic speed may be indicative of a localized problem which warrants action, the activation of signs for example, to alert motorists to a potentially dangerous condition that is being approached and/or to change the posted legal operating conditions. At the present time, sensors which provide signals from which traffic flow information may be derived are mounted in or on the pavement. Such sensors, for permanent installation, are typically in the form of a pair of spaced magnetic loop detectors embedded in the pavement. In the case of temporary installations, such as in construction areas, such sensors may take the form of spaced pneumatic tubes which are secured to the surface of the pavement. These prior art sensors provide a pair of "switch closures", i.e., two electrical pulses spaced by a variable time period, for each vehicle detected.

The use of sensors which are installed in or on the pavement presents a number of significant problems. In the case of the magnetic loop detectors which are embedded in the pavement, installation is expensive and requires the creation of a dangerous condition while the traffic lane in which the sensor "antenna" is being installed is closed to permit such installation. Furthermore, because the operating environment is exceedingly harsh, particularly where the pavement is subjected to large variations in temperature, such loop detectors are prone to breakage. Repair of a broken loop detector presents the same problems as the initial installation. In the case of pneumatic tubes, which are directly subject to impact by vehicles, service life is relatively short due to the harsh operating conditions.

It has been suggested that radiant energy, and particularly conventional Doppler radar, could be used to replace the above-discussed loop antennas and surface installed sensors. However, loop antennas and surface installed sensors have the ability to detect moving traffic in a single lane of travel whereas the prior art devices which employ radiant energy, such as Doppler radar transceivers, do not have the ability to accurately detect motion within a single traffic lane only. A further deficiency of previously available vehicle detectors employing microwave radar results from the fact that such radar devices produce beams which are characterized by side-lobes. Reflection of the side-lobe energy is known to produce "false" vehicle detections. Additionally, the central traffic control station data processing equipment which is presently installed is typically capable of using information in the form of the above-discussed "switch closures" and the output signals provided by present microwave radar detectors is not compatible with such existing data processing equipment.

In addition to the above-mentioned criteria, it is essential that a traffic detector employed in a freeway management system provide only valid information, i.e., the detector must be able to discriminate between vehicular traffic moving in a direction of interest and stray reflections, movement of animals, wrong way traffic, etc. Similarly, in order to be suitable for a freeway management system application, a motion detection and discrimination device and technique must be highly reliable and have only modest power supply requirements.

SUMMARY OF THE INVENTION

The present invention overcomes the above-briefly described and other deficiencies and disadvantages of the prior art by providing a novel and improved out-of-road vehicle detector which is easy to install and maintain, which has the capability of detecting moving vehicles in either a single traffic lane or plural lanes, which detects vehicles only once, which is vehicle direction sensitive and which provides output signals commensurate with the speed of detected vehicles. The present invention also comprises a novel technique for processing signals provided by the detector so as to emulate existing traffic control information sensing equipment and/or for providing signals commensurate with the occurrence and disappearance of predetermined abnormal traffic flow conditions. The present invention additionally has the capability of generating command signals commensurate with individual vehicle speed which exceeds a variable speed threshold. Further, when employed to detect traffic in a single lane, the present invention may also be employed to provide information from which "occupancy", i.e., the relative sizes of vehicles detected, may be determined.

In accordance with the preferred embodiment, a vehicle detector in accordance with the invention employes a microwave radar transceiver/horn antenna which is mounted above the road and oriented precisely with respect thereto. The radar transceiver may be arranged so as to focus the generated radar energy into a small area within a single traffic lane. The detector may also include a side-lobe attenuator which eliminates the possibility of side-lobe energy being reflected back to the antenna. The output signals provided by the microwave radar are processed, in accordance with a first embodiment, to provide vehicle speed information signals in an ASCII format at a serial data port and/or to activate a pair of opto-isolator closures to emulate a pair of loop detectors or pneumatic tubes arranged in a speed trap configuration.

The method and apparatus of the present invention is also characterized by the ability to process vehicle speed information provided by the microwave radar in order to detersnine traffic flow conditions based upon pre-selected speed and direction criteria. Accordingly, apparatus in accordance with the invention may be provided with a means for setting "incident" speed and clear thresholds. In such case, the speed of each vehicle traveling in the "normal" direction is compared to the speed thresholds. Thus, when a vehicle is detected, its speed is compared to the preselected "incident" speed threshold. If the speed is less than the threshold, an "incident" counter is incremented. If the vehicle speed is greater than the "incident" threshold, that speed is compared to an "incident-clear" threshold. If the speed is greater than the "incident-clear" speed threshold, an "incident-clear" counter will be incremented. The detection of consecutive vehicles travelling at speeds above or below the respective thresholds will result in the generation of a output signal indicative of the occurrence of an "incident" or the absence, i.e., the clearing, of an "incident".

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which:

FIG. 6 is an information flow diagram which depicts the employment of the present invention for incident detection.

DESCRIPTION OF THE DISCLOSED EMBODIMENT

Figure 1:
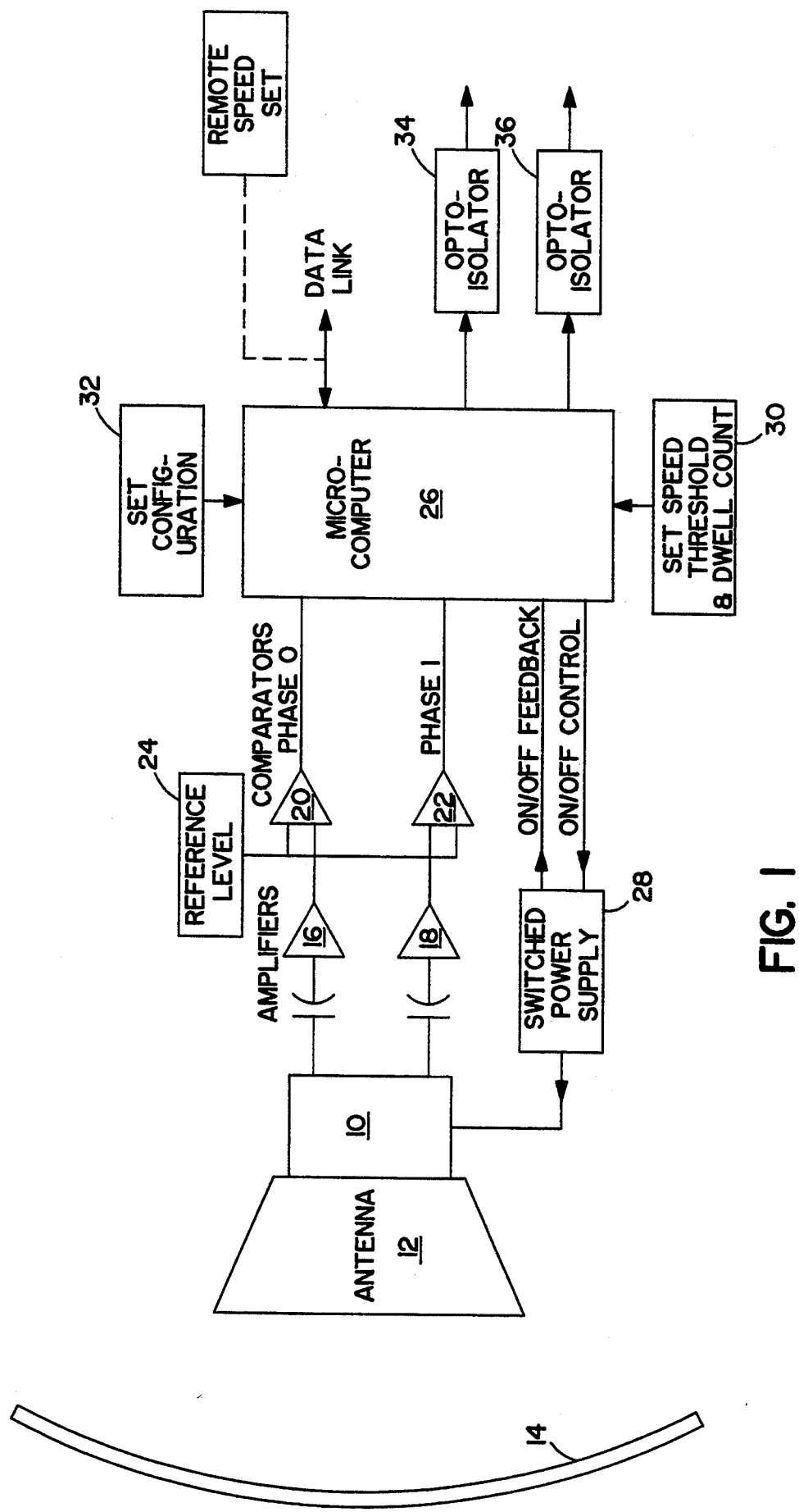
FIG. 1 is a block diagram of apparatus in accordance with a preferred embodiment of the invention.

With reference now to the drawings, FIG. 1 is a block diagram of an out-of-road vehicle detector in accordance with the present invention. The invention includes a continuous wave microwave radar transceiver 10 with an associated feed antenna 12 and parabolic reflector 14. Transceiver 10 is a commercially available device which functions as pulsed mode Doppler radar. Such radar may, for example, employ a Gunn diode mounted in a wave guide cavity to act as a transmitter and local oscillator and Schottky barrier mixer diodes which function as receivers for relected microwave energy. Such Gunn diode Doppler radar is, for example, available from Alpha Industries, Inc. of Woburn, Mass. In such radar, the receiver mixer diodes are located one-quarter wave-length apart at the transmitter frequency so that the Doppler outputs have a 90° phase shift. Thus, the mixers have peak Doppler amplitudes that lag each other and, if an object moves towards the tranSceiver, a peak output signal from one of the mixer diodes occurs when the other is at a null. As will be discussed below, these phase relationships are used to determine object direction and speed.

Continuing to refer to FIG. 1, the pair of 90° out-of-phase output signals provided by transceiver 10 are capacitively coupled respective to IF amplifiers 16 and 18. The output signals provided by amplifiers 16 and 18 are respectively applied as first inputs to comparators 20 and 22. The second input to each of comparators 20 and 22 is provided by reference signal source 24. The output of comparator 20 will comprise a square wave signal, hereinafter referred to as the PHASE 0 signal, having a frequency which is commensurate with the speed of an object which is reflecting the transmitted microwave energy. Similarly, the output of comparator 22 will comprise a square wave of the same frequency, hereinafter the PHASE 1 signal. The outputs of comparators 20 and 22 are delivered to a microprocessor 26 which functions as the CPU of the detector.

Microprocessor 26 controls a switched power supply 28 so as to cause the energization of transceiver 10. Microprocessor 26 also receives, as input information, a feedback signal from a voltage sensor in the power supply 28. Further inputs to microprocessor 26 comprise a speed threshold signal and a "dwell count", which are dip switch selected and represented on FIG. 1 as the outputs of a signal generator 30, and configuration information. The configuration information is schematically indicated in FIG. 1 as a mode control signal generator 32 and, in actual fact, will comprise "jumper" connections at the microprocessor. The preset configuration information will include the direction in which the unit is aimed, i.e., whether the detector is to be responsive to approaching or receding traffic.

Microprocessor 26 outputs information bearing signals to a data link which may, for example, be a radio transmitter or dedicated telephone line. The data link output may include a conventional RS-232 port on the detector and the output information may be provided in ASCII format. The microprocessor 26 may also activate a pair of opto-isolators 34 and 36 to thereby emulate a pair of loop detectors. That is, the opto-isolators will appear to the downstream apparatus, a central traffic control station data processor for example, as switches. Thus, opto-isolators 34 and 36 will cooperate to provide a pair of output signals, spaced in time, which correspond to a pair of sequential switch closures separated by a time commensurate with vehicle speed.

Figure 2:
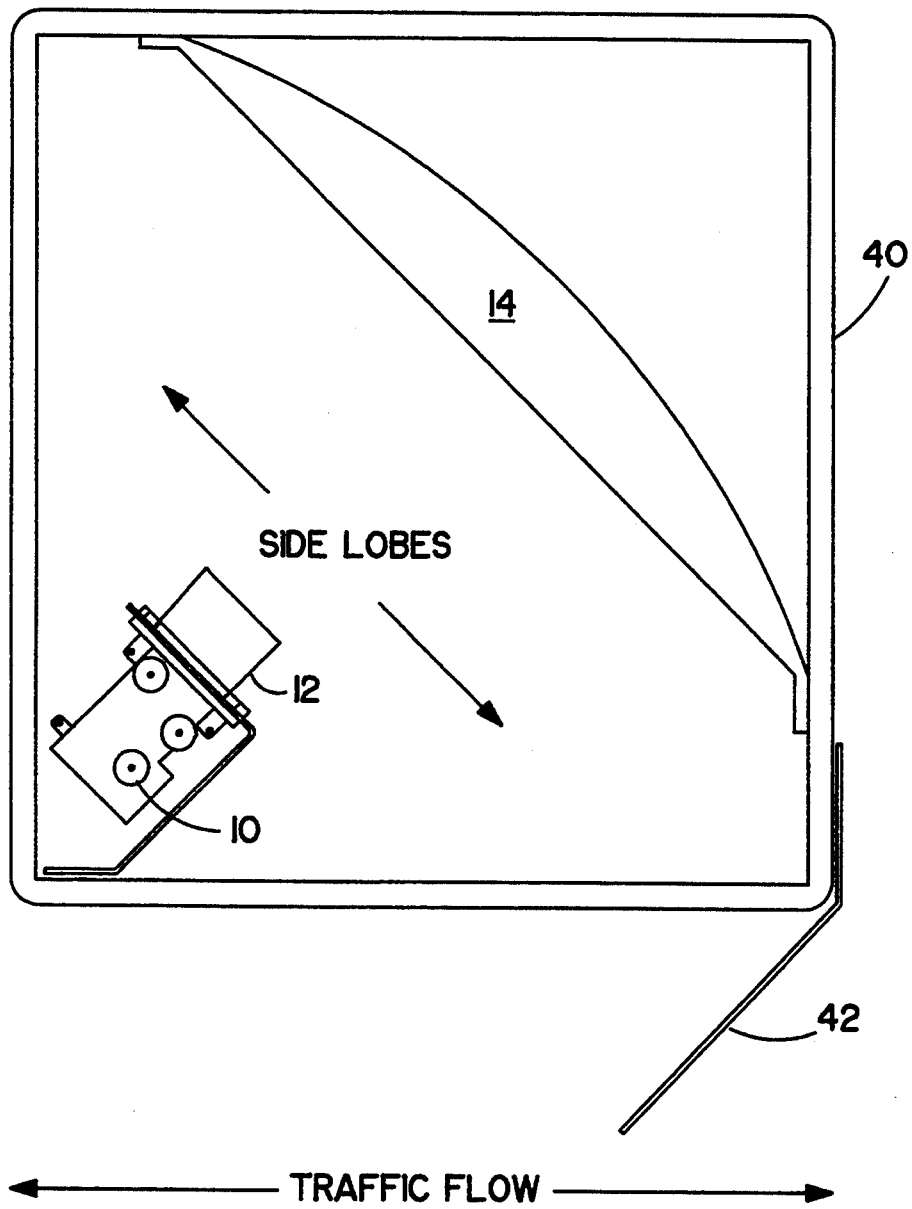
FIG. 2 is a cross-sectional side elevation view of a first embodiment of actual hardware which includes the apparatus depicted schematically in FIG. 1.

In terms of physical structure, as may be seen from FIG. 2, a detector in accordance with the disclosed embodiment of the invention includes a weather tight enclosure 40. The radar transceiver 10, feed horn 12, reflector 14 and the remainder of the electronics will all be mounted within enclosure 40. Enclosure 40, in turn, will be mounted above the road with its planar bottom surface oriented substantially parallel to the road surface and aligned substantially parallel to the travel lane(s) to be monitored. The enclosure 40 will be provided with mounting brackets, not shown, which permits the required orientation to be easily achieved. In one reduction to practice, the detector was designed to focus the radar energy into an area having a diameter of between three and six feet when mounted at a height above the road in the range of 16 to 32 feet. This arrangement will result in the detection of traffic in a single traffic lane only and the software control will insure that each vehicle will be detected only once as it passes through the detection area. It is to be understood that, if the detector is to be used for "incident" detection purposes only, a "wide angle" beam of microwave energy may be transmitted whereby vehicles in multiple travel lanes can be detected.

Continuing to refer to FIG. 2, the orientation of the antenna, i.e., the feed horn 12 and associated parabolic reflector 14, is critical in the practice of the invention.

In order for Doppler radar to accurately detect vehicle speed, the radar beam must be at some angle less than 90° with respect to the traffic flow. Target vehicle speed is directly related to the cosine of the angle between the radar beam and the direction of traffic flow. In the practice of the present invention, the radar beam axis is fixed, by means of the antenna location, at a known angle with respect to traffic flow. This establishes a constant cosine factor for accurate speed calculations. In the interest of minimizing enclosure size and facilitating detector installation, the parabolic reflector 14 and the transceiver/feed antenna 10, 12 are set at a 45° angle within enclosure 40 if the sensor is to operate in a narrow beam mode and thus monitor only a single traffic lane. This sets the angle factor at the cosine of 45° or 0.7071. Accordingly, the microprossesor can simply correct each speed reading by a factor of 1/0.7071 or 1.414 times the reading. When the sensor is to operate in a "wide" beam mode, and receive reflected energy from plural traffic lanes, the reflector 14 will typically not be employed and the angle between the transmission axis of the beam of microwave energy and the base of housing 40 will typically be 15°.

A microwave radar transceiver/horn antenna will typically generate a main beam of radiant energy, accompanied by undesirable side-lobe beams. The side-lobe energy will be radiated approximately 90° with respect to the main beam. Reflections of energy in these side-lobe beams from moving objects can result in inaccurate vehicle counts and calculation of incorrect vehicle speed. Additionally, side-lobe energy scattered off various surfaces may cause interference with the main beam. Accordingly, at least in the narrow beam mode, the present invention employs a side-lobe attenuator 42 positioned and shaped to intercept downwardly directed side-lobe energy and reflect such energy away from traffic and the main beam.

Figure 3:
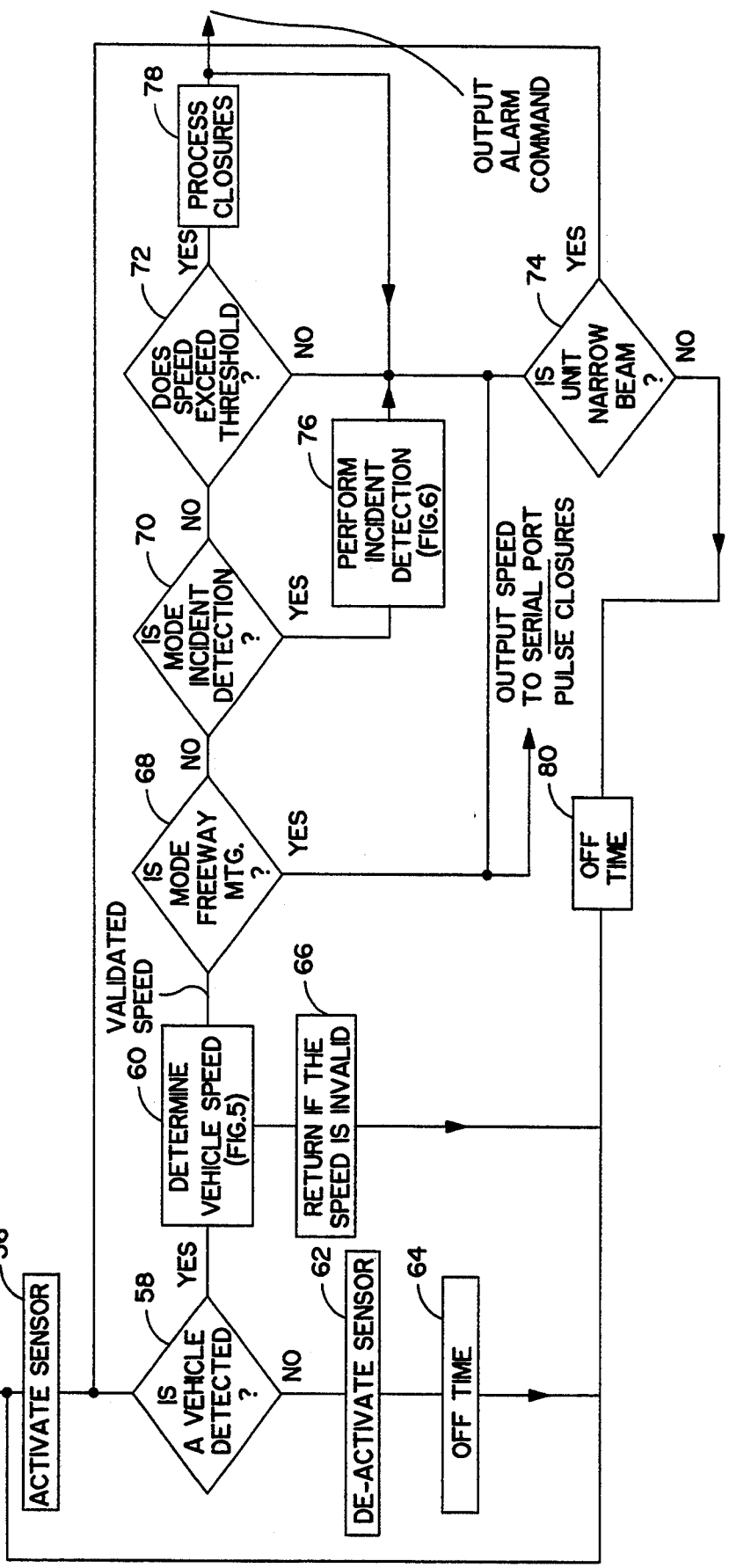
FIG. 3 is an information flow diagram which represents the general algorithm implemented by the invention.
Figure 4:
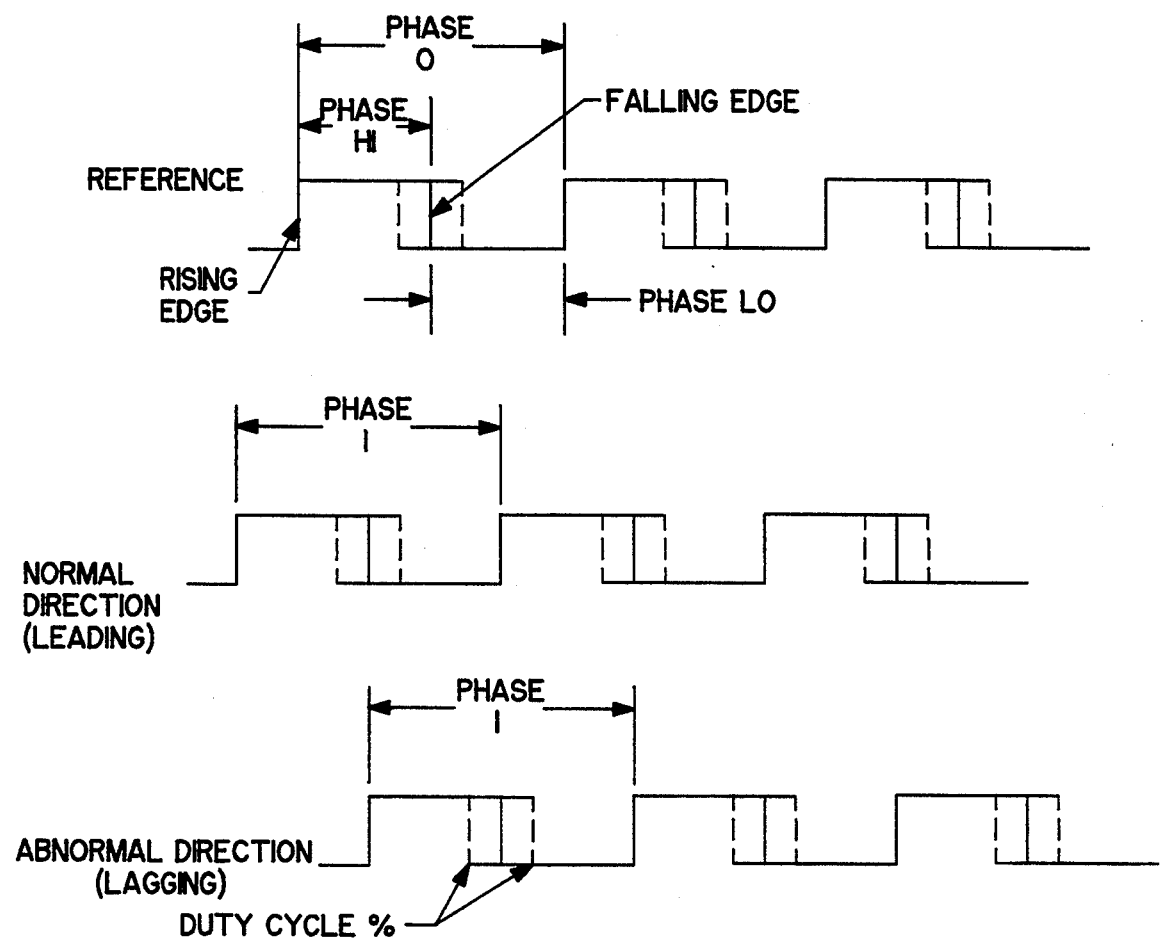
FIG. 4 is a timing diagram which depicts the signal wave forms of the sensor portion of the apparatus of FIG. 1.

The operation of the detector of FIGS. 1 and 2 will now be described by reference simultaneously to FIGS. 3 through 5. FIG. 3 is an overall system flow diagram. FIG. 4 is a wave form diagram which explains the manner in which signals commensurate with vehicle direction and speed are derived from the outputs of transceiver 10. FIG. 5 is a flow chart depicting the processing of data to derive vehicle speed and direction information in accordance with a preferred embodiment of the invention.

As represented in FIG. 3, upon installation and application of power, the detector is initiallized (step 50), the mode of operation is established by means of the above-discussed configuration signal generator 32 (step 52) and the speed and "dwell" thresholds are established by means of signal generator 30 (step 54). The radar transceiver, i.e., the sensor portion of the detector, is then activated for predetermined periods of time under the control of microprocessor 26 via the switched power supply 28 (step 56). Signals commensurate with microwave energy relected from an object located in the field, i.e., the region illuminated by the radar beam of the transceiver, will be processed. The manner in which the initial signal processing is accomplished may be seen from FIG. 4 and will be discussed below in the description of FIG. 5. As indicated in step 58, if the initial signal processing indicates energy reflected from a moving object in the field of the radar beam, the speed of the object will be determined (step 60). If a moving object is not detected, the transceiver will be deactivated (step 62) and, after a predetermined "off" time, will be reactivated (step 64).

If a moving object is present in the field, as part of the speed determination step 60 an attempt will be made to determine whether the speed of the object is "valid". If the speed is "invalid", i.e., if the speed fails to satisfy preselected criteria which have been established to insure against "false" information, the radar transceiver will be reactivated in order to acquire additional information on the same object (step 66). If the object speed which is determined is "valid", the manner in which the speed information is processed will be determined by the configuration settings (steps, 68, 70, 72 and 74). If the detector is set to the freeway management mode, wherein the information to be outputted is vehicle speed only, the speed signal determined in step 60 will be sent to the data link and/or used to control the pulse closures (step 68). The freeway management mode is typically also a wide beam mode. If the detector is not in the freeway management mode, a check will be made to determine whether it is in the incident detection mode. If in the incident detection mode, the incident detection algorithm as disclosed in FIG. 6 will be solved (step 76). If the detector is not in the incident detection mode, the speed will be compared with a preset threshold speed. If the speed exceeds the threshold, i.e., if the detected vehicle is exceeding the limit, "switch closures" will be processed (step 78) and, for example, a "slow down" warning will be activated. If the speed does not exceed the threshold, or if the detector is in the freeway management mode, or if the incident detection algorithm has been performed, a check is made to determine whether the unit is a narrow beam, i.e., one lane, sensor (step 74). If the detector is not a narrow beam unit, the sensor will be reactivated after a predetermined off time (step 80). However, if the detector is a narrow beam unit, the sensor will be maintained in the activated state so that occupancy, i.e., the size of the vehicle, can be determined from the duration of the reflection and the speed.

In order to operate the opto-isolators of FIG. 1, the microprocessor 26 will compute the time between pulses that equals the timing between the output signals that would have been provided by a pair of in-the-road or on-the-road sensors. This time between pulses is directly proportional to vehicle speed, assuming a known distance between the in-the-road or on-the-road sensors. The microprocessor will, accordingly output a pulse to operate opto-isolator 34, wait the computed time between pulses, and then will output a pulse to operate the opto-isolator 36.

As discussed above, if the detector is being operated in the "narrow beam" mode, i.e., if vehicle related information is being acquired from only a single traffic lane as may be required to determine "occupancy" data, the determination of a "valid" speed will cause the sensor to remain activated as long as the "target" vehicle remains in the field. This mode of operation also virtually insures that each vehicle will be detected only once. In the narrow beam mode, the information computed by the microprocessor will be outputted during the short time periods of preselected length when the radar transmitter is turned off after the "target" has been lost. As discussed above, if the detector is a wide beam unit, the transmitter will be turned off for a preselected time after each "valid" speed has been computed.

With reference now simultaneously to FIGS. 4 and 5, the step of processing the information bearing signals which appear at the outputs of amplifiers 16 and 18 (see FIG. 1) will be described. The initial signal processing is performed in order to determine whether or not the signals commensurate with reflected energy provided by transceiver 10 are "valid". Samples of "invalid" signals are those indicative of background noise, i.e., swaying trees, blowing leaves, snow, fog, rain, electrical noise, etc., and those resulting from reflections from animals or other objects moving at an angle with respect to the normal traffic direction. Ideally, the output provided by each of the mixer diodes of transceiver 10 is a square wave signal with a 50% duty cycle and the outputs of both mixer diodes are at the same frequency. Also, ideally, one of these square wave signals is leading or lagging the other by 90°. In actual practice, the frequency of the two square waves can be slightly different, the duty cycle can be something other than 50% and the phase shift can be slightly less or greater than 90°. Accordingly, a software routine is employed to verify duty cycle and match frequencies, to compare phase and to compute and then double check speed.

Figure 5A:
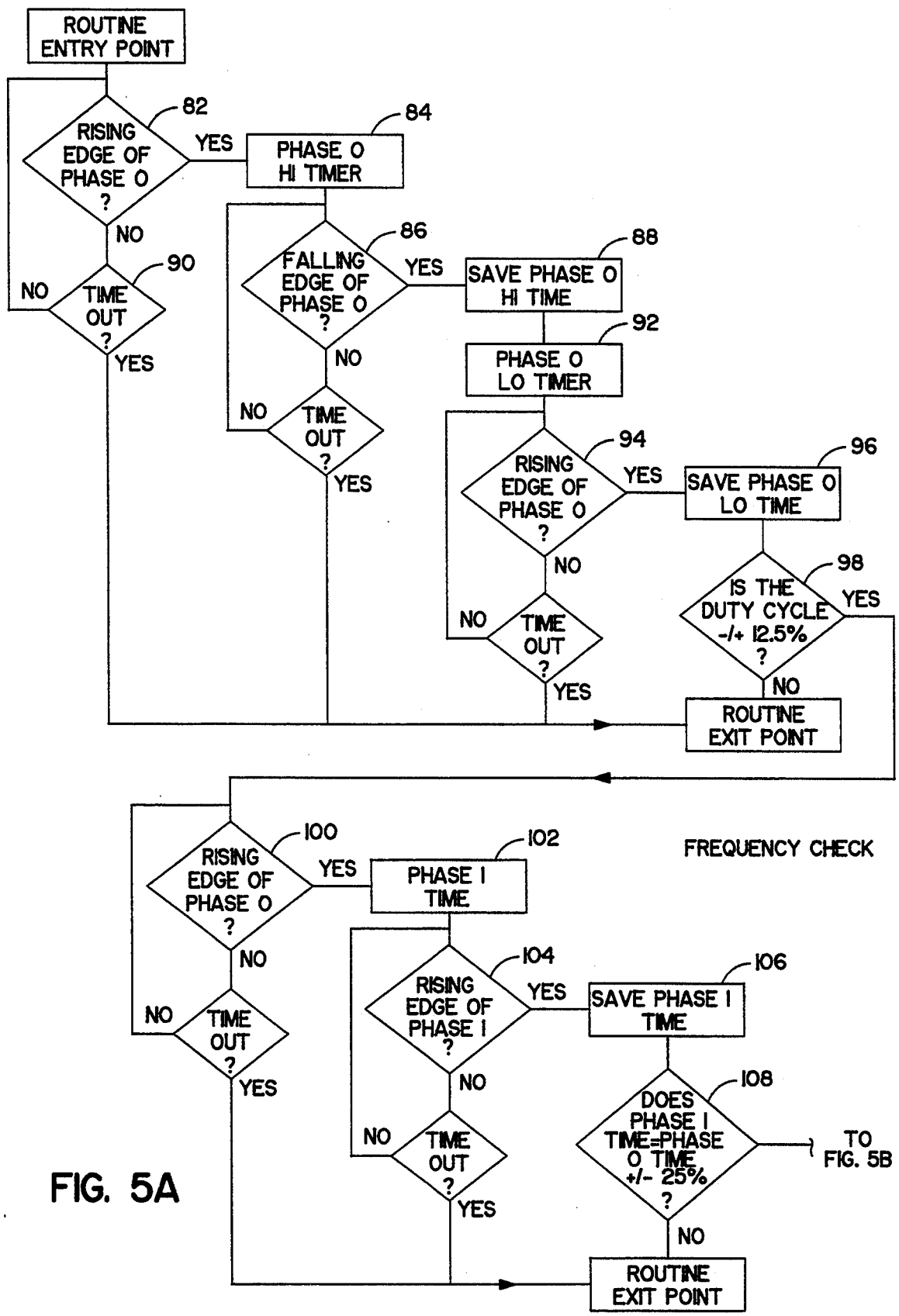
FIGS. 5A and 5B comprise an information flow diagram for a preferred embodiment of the apparatus of FIG. 1, FIG. 5 representing how the wave forms of FIG. 4 are processed in to determine and validate speed.

Referring to FIG. 5A, a software timer is started (step 82) upon detection of a rising edge on the PHASE 0 input. The timer is represented by steps 84 and 86. The time value (PHASE 0 HI TIME) is saved (step 88) upon detection of the first falling edge and the timer is reset (step 90). The time until a rising edge is detected is then measured (steps 92 and 94). This timer value, i.e., PHASE 0 LO TIME is also saved (step 96). The sum of these two values, i.e., PHASE 0 HI TIME and PHASE 0 LO TIME, is the PHASE 0 TIME PERIOD. A duty cycle window is checked by comparing the PHASE 0 HI TIME plus 25% to the PHASE 0 LO TIME and by comparing the PHASE 0 HI TIME minus 25% to the PHASE 0 LO TIME (step 98). It is to be noted that 25% of the PHASE 0 LO TIME is ideally 12.5% of the PHASE 0 TIME PERIOD.

If the duty cycle is within the duty cycle window, the time period of the PHASE 1 SIGNAL is determined in steps 100, 102, 104 and 106, and the PHASE 1 TIME is compared to the PHASE 0 TIME+25% and to the PHASE 0 TIME−25%. If the PHASE 1 TIME is within the frequency window, i e., if the PHASE 1 TIME the PHASE 0 TIME+/−25%, a frequency check is satisfied.

Figure 5B:
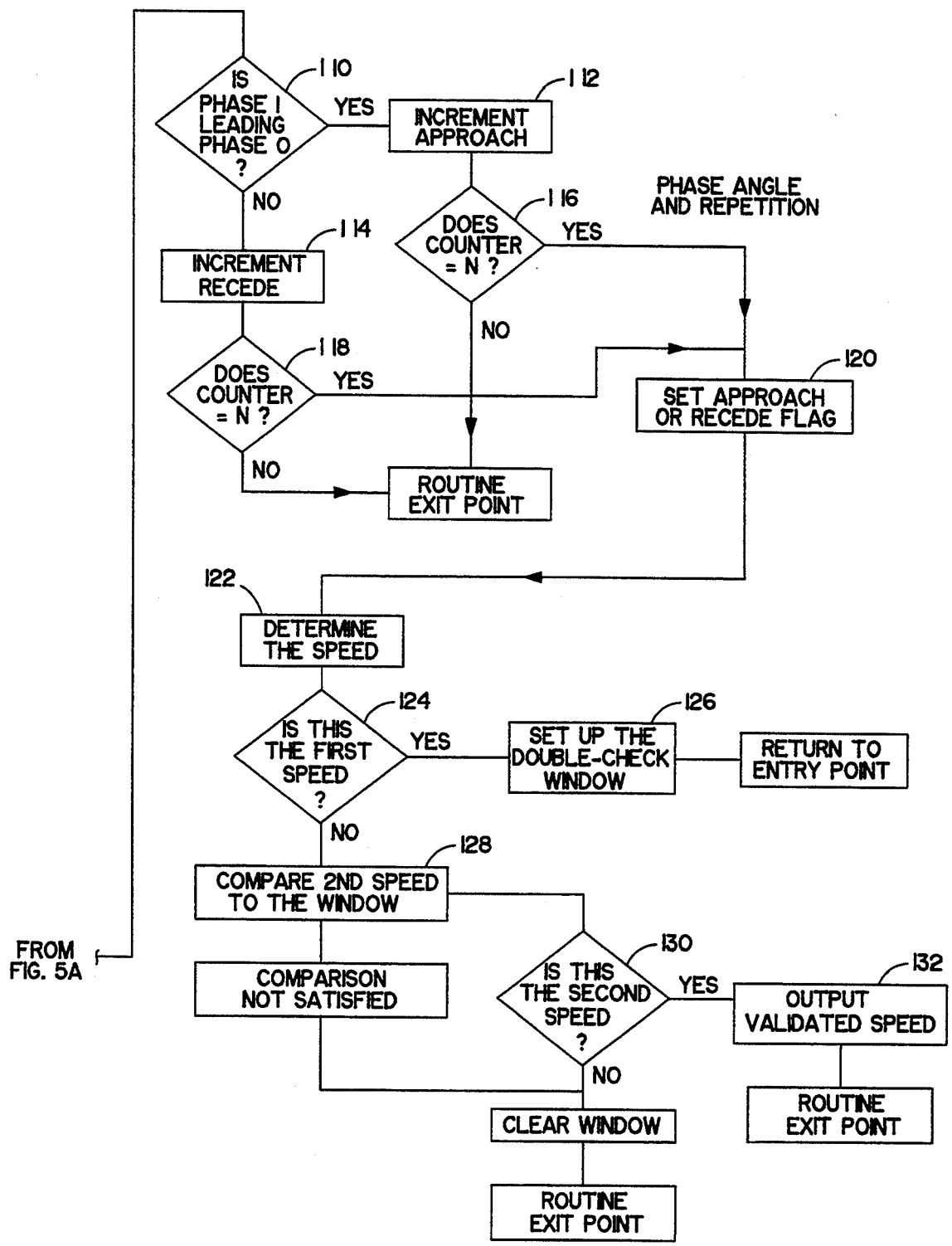

Referring to FIG. 5B, if the frequencies of the PHASE 0 and PHASE 1 signals are within range, the PHASE angle of the PHASE 1 signal with respect to the PHASE 0 signal is determined. This phase angle comparison is performed by first ascertaining whether the PHASE 1 signal is leading the PHASE 0 signal (step 110). This is accomplished by sensing the level of the PHASE 1 signal when the rising edge of a PHASE 0 signal occurs. If the PHASE 1 signal is high when the leading edge of the PHASE 0 signal occurs, the PHASE 1 signal is leading the PHASE 0 signal and this is indicative of an "approach", i.e., the detected vehicle is travelling toward the detector. Conversely, if the PHASE 1 signal is low when the leading edge of the PHASE 0 signal occurs, the PHASE 1 signal is lagging the PHASE 0 signal and the detected vehicle is receding, i.e., is moving away from the detector. The possible phase relationships between the PHASE 0 and PHASE 1 signals may be seen from FIG. 4.

The "normal" direction of travel can be either toward or away from the detector. The "normal" direction is "set" by the configuration signal generator 32 and provided as input information to microprocessor 26. For purposes of explanation, it will be presumed that the "normal" direction of traffic travel is toward the detector, i.e., the detector is mounted so as to monitor approaching traffic. If the PHASE comparison is indicative of motion in the "normal" direction, an approach counter is incremented (step 112). If the PHASE 1 signal is lagging the PHASE 0 signal, a recede counter is incremented (step 114). The numbers in the approach and recede counters are compared to predetermined limits (respectively in steps 116 and 118) which, in the case of the present invention, are the same. The process continues until the counter commensurate with the "normal" direction is incremented to its limit or the routine is exited because either the duty cycle or frequency falls outside of its accepted range.

When the appropriate one of the approach or recede counters reaches its limit, a corresponding flag will be set (step 120) and the speed of the object will be determined (step 122). In accordance with the disclosed embodiment of the invention, speed is determined by counting the number of rising edges of the PHASE 0 signal which occur over a fixed period of time after the approach counter limit has been exceeded. The number of rising edges counted will be directly proportional to vehicle speed. The "first" computed speed may be outputted or, as depicted in FIG. 5B, may be used to create a window of acceptable speeds (steps 124 and 126) for comparison to a second speed reading, i.e., a "double check" is performed. The second speed reading is determined employing the same methodology as the first reading. The "second" speed is checked against the window of acceptable speeds, i.e., the "first" computed speed +/−percentage which is preselected (step 128). If the "second" speed is within the acceptable range, the "second" speed is saved and passed to the output routine (steps 130 and 132) as discussed above in the description of FIG. 3. The "first" or "second" speed signal may, after having been placed in ASCII format, be transmitted by a data link to the freeway management control center. The second speed signal may also or alternatively be employed for the purpose of exercising control over the serial activation of the opto-isolators 34 and 36, with the output signals provided by the opto-isolators being delivered to the freeway management control center.

Apparatus in accordance with the present invention also includes the capability of detecting an "incident", i.e., an abnormal traffic flow condition which may signify the need to implement a protective action. By way of example, should an obscuration of visibility or an accident occur, such an "incident" will be indicated by an abnormal reduction in average vehicle speed. The detection of a sudden and unusual reduction in average speed can be employed to "close" the freeway or take other appropriate measures at a point located upstream of the detector. FIG. 6 is a flow diagram which shows the "incident" detection algorithm which may be implemented by the microprocessor 26. It is to be understood that, in performing the process of FIG. 6, upon detection of a moving vehicle, the microprocessor will determine speed in the manner depicted in FIG. 5 (steps 144 and 146) and the "first speed" information will customarily be employed for incident detection purposes. When operating in the FIG. 6 mode, the detector will, upon initialization (step 140), read values of the "incident" speed threshhold and "dwell count" (step 142) which are provided at the output of signal generator 30. The "dwell count" corresponds to the number of consecutive vehicles which must be observed below the "incident" speed threshhold or above a computed "incident clear" threshold prior to any output activations.

During operation, the speed of each vehicle in the normal direction is compared to the programmed "incident" speed threshold (step 148) and to an "incident clear" speed threshhold (step 150) which is computed by microprocessor 26. The "incident clear" threshold speed will typically be the "incident" speed threshold +25%. When a vehicle is detected, its speed is first compared to the "incident" or "low" speed threshold. If the measured speed is less than the "low" threshold, a "congestion" counter will be incremented (step 152) and a "no congestion" counter will be cleared (step 154). However, if the measured speed is greater than the "low" threshold, a check will be made to see if the speed is greater than the computed "incident clear" or "high" speed threshold. If the measured speed is less than the "high" threshold, neither of the counters will be incremented. However, if the measured speed is greater than the "high" speed threshold, the "no congestion" counter will be incremented (step 156) and the "congestion" counter will be cleared (step 158).

The incident detection routine will produce output signals only when the count in the "congestion" counter or the "no congestion" counter exceed the preselected "dwell" count (see respectively steps 160 and 152). Thus, if a number of vehicles in excess of the preselected "dwell" count are detected travelling at a speed which is less than the "low" threshold speed, a coded output signal, the "Z" signal, will be generated (step 164) and the "congestion" counter will be cleared (steps 166 and 168). Similarly, if a number of consecutive vehicles having speeds which are above the "high" threshold speed are detected, an "I" signal indicative of the "incident" having ended will be outputted (step 170) indicating that traffic is flowing normally. The "no congestion" counter will be cleared (steps 172 and 174) each time an "I" signal is outputted.

While the incident detection routine may be employed with either a narrow or wide beam microwave transmitter depending upon the nature of the information required by the freeway management control center, it will typically be used in the narrow beam mode. Also, the "low" threshold speed signal may be varied from a remote location as indicated schematically in FIG. 1, a two way data link being employed for this purpose. It is also within the capabilities of the invention to set, rather than compute, the "high" threshold speed. As mentioned in the description of FIG. 3, it is further possible to employ the present invention to activate a warning device if the measured speed, i.e., the signal commensurate with the "second speed", exceeds a preselected threshold level. This preselected level may be selected via signal generator 30, information commensurate therewith may be delivered to microcomputer 26 by the data link or the information employed to increment the "no congestion" counter of FIG. 6 may be employed.

While a preferred embodiment has been shown and described, various modifications and substitutions may be made thereto without departing from the spirit and scope of the invention. Accordingly, it is to be understood that the present invention has been described by way of illustration and not limitation.

What is claimed is

1. A method for obtaining information concerning vehicular traffic flow comprising the steps of:

energizing a transmitter to cause emission of electromagnetic energy at a known frequency in the microwave range;

directing the emitted energy to cause a preselected region of a highway to be illuminated thereby;

receiving, at a pair of spacially displaced points, electromagnetic energy reflected from a vehicle moving through the illuminated region, the spacing of said receiving points being commensurate with a known phase relationship for energy reflected from a stationary vehicle;

transducing the reflected energy received at said pair of points into a pair of phase-related cyclic signals, the frequency of said signals being commensurate with vehicle speed;

employing said phase-related signals to perform a first determination of the speed of the vehicle;

employing said first speed determination to establish a valid speed range;

receiving additional electromagnetic energy reflected from the vehicle;

transducing said additional reflected energy into a further pair of phase-related signals;

employing said further pair of phase-related signals to perform a second determination of the speed of the vehicle;

comparing the second determined speed of the vehicle with the established valid speed range; and outputting a signal commensurate with the second vehicle speed if the determined second speed is within the valid speed range.

2. The method of claim 1 wherein the steps of performing a determination of speed from a pair of phase-related signals each includes:

comparing the phase of the signals of said pair to determine if there is a difference in phase therebetween which is greater or less than the phase relationship commensurate with a stationary object, any such variation in phase difference from said known phase relationship being indicative of whether the vehicle is approaching or moving away from the transmitter;

establishing a direction of motion of interest;

comparing the direction of motion indicated by the phase difference with the direction of interest; and determining the vehicle speed if the vehicle motion commensurate with any phase difference is in the direction of interest.

3. The method of claim 2 wherein the steps of performing a determination of vehicle speed each further comprise:

comparing the time of succeeding half cycles of at least one of said phase-related signals of each said pair of phase-related signals to determine if the at least one signal has a duty cycle which is within a preselected range;

comparing the frequency of the signals of each said pair of phase-related signals; and determining speed only if the duty cycle is within a preselected range and if any difference in frequency is less than a preselected magnitude.

4. The method of claim 1 wherein the step of directing the emitted electromagnetic energy to a region of a highway comprises:

focusing the emitted energy into a region lying within a single traffic lane.

5. The method of claim 3 wherein the step of directing the emitted electromagnetic energy to a region of a highway comprises:

focusing the emitted energy into a region lying within a single traffic lane.

6. A method of emulating an in-the-road vehicle sensor, the sensor to be emulated including a pair of loop antennas which are spaced apart by a known distance, said method comprising the steps of:

positioning a microwave transceiver such that microwave energy generated thereby will be transmitted as a beam having an axis which intersects a vehicle travel path of interest at a known angle, said transmitted microwave energy illuminating a region of a highway through which vehicles will pass;

receiving microwave energy reflected from a moving vehicle passing through said illuminated region;

processing the received microwave energy reflected from a moving vehicle to determine the direction of travel of the vehicle;

further processing the received microwave energy reflected from the moving vehicle to determine the speed of the vehicle if the direction of motion is the direction of interest; and generating a serial pair of electrical signals which are spaced by a period of time required by a vehicle traveling at the determined speed to travel the said known distance.

7. The method of claim 6 further comprising the step of:

applying said signals of said pair of spaced electrical signals to respective output signal generators, said output signal generators each including a switching device which is electrically isolated from the respective signal of said pair.

8. Apparatus for detecting the speed of vehicles travelling along a highway comprising:

a housing, said housing being weathertight, said housing including a bottom wall and a side wall, at least portions of said bottom and side walls defining a pair of planes which intersect at an angle of substantially 90°;

a microwave transceiver positioned within said housing, said transceiver including a microwave generator which provided a beam of electromagnetic energy when energized, said beam having an axis;

means supporting said microwave generator such that said beam axis intersects the plane defined by said bottom wall at an angle of 45°;

signal processor means for determining the frequency of signals commensurate with transmitted energy which are reflected back to said microwave transceiver along said beam axis, said signal processing means including means for compensating for said angle of intersection between said beam axis and the plane defined by said housing bottom wall whereby said signal processor means can provide signals commensurate with vehicle speed in a direction generally parallel to said housing bottom wall; and means responsive to said signal processor means provided signals for generating output signals commensurate with the speed of a vehicle from which energy is reflected, said output signals being available at the exterior of said housing.

9. The apparatus of claim 8 wherein said transceiver means further includes:

an antenna which receives energy from said microwave generator and emits said energy; and a parabolic reflector for focusing energy emitted from said antenna into said beam.

10. Apparatus for detecting the speed of vehicles travelling along a highway comprising:

a housing, said housing being weatherweight, said housing including a bottom wall and a side wall, at least portion of said bottom and said walls defining a pair of planes which intersect at an angle substantially 90°;

a microwave transceiver positioned within said housing, said transceiver including a microwave generator which provides a beam of electromagnetic energy when energized, said beam having an axis and a radiation pattern which includes side lobes;

means supporting said microwave generator such that said beam axis intersects the plane defined by said bottom wall at a preselected angle;

said lobe suppressor means affixed to and extending from said housing to prevent the return of reflected energy commensurate with the beam side lobes to said transceiver means;

signal processor means for determining the frequency of signals commensurate with transmitted energy which are reflected back to said microwave transceiver along said beam axis, said signal processor means including means for compensating for said angle of intersection between said beam axis and the plane defined by said housing bottom wall whereby said signal processor means can provide signals commensurate with vehicle speed in a direction generally parallel to said housing bottom wall; and means responses to said signal processor means provided signals for generating output signals commensurate with the speed of a vehicle from which energy is reflected, said output signals being available at the exterior of said housing.

11. The apparatus of claim 10 wherein said electrical pulse generating means comprises at least a pair of opto-isolators.

12. Apparatus for detecting the speed of vehicles travelling along a highway comprising:

a housing, said housing being weatherweight, said housing including a bottom wall and a side wall, at least portion of said bottom and said walls defining a pair of planes which intersect at an angle substantially 90°;

a microwave transceiver positioned within said housing, said transceiver including a microwave generator which provides a beam of electromagnetic energy when energized, said beam having an axis;

means supporting said microwave generator such that said beam axis intersects the plane defined by said bottom wall at a preselected angle;

signal processor means for determining the frequency of signals commensurate with transmitted energy which are reflected back to said microwave transceiver along said beam axis, said signal processor means including means for compensating for said angle between said beam axis and the plane defined by said housing bottom wall whereby said signal processor means can provide signals commensurate with vehicle speed in a direction generally parallel to said housing bottom wall; and means responsive to said signals commensurate with vehicle speed provided by said signal processor means for generating electrical pulses spaced by a time period commensurate with vehicle speed whereby said apparatus emulates an in-the-road vehicle detector.

13. A method of detecting the occurrence of an incident on a highway, the incident causing a change in the average speed of motor vehicles traveling on the highway, said method comprising the steps of:

illuminating a region of the highway with cyclic electromagnetic energy in the microwave frequency range;

receiving microwave energy reflected from the illuminated region at a pair of spacially displaced points;

transducing the reflected energy received at said pair of points into a pair of phase-related cyclic signals, the frequency of said signals being commensurate with the speed of a vehicle moving through said region;

comparing the phase of the signals of said pair to determine if there is a difference in phase therebetween which is greater or less than a known phase relationship commensurate with a stationary object, any such variation in phase difference from said known phase relationship being indicative of whether the vehicle is approaching or moving away from the transmitter;

establishing a direction of motion of interest;

comparing the direction of motion indicated by the phase difference with the direction of interest;

determining the vehicle speed if the vehicle motion commensurate with any phase difference is in the direction of interest;

comparing the determined vehicle speed with a low threshold speed, the low threshold speed being indicative of the occurrence of an incident;

incrementing a congestion counter if the vehicle speed is less than the low threshold speed;

clearing a no congestion counter if the vehicle speed is less than the low threshold speed;

comparing the vehicle speed with a high threshold speed if the vehicle speed is above the low threshold speed, the high threshold speed being greater than the the low threshold speed by a preselected magnitude;

incrementing a no congestion counter if the vehicle speed is greater than the high threshold speed;

clearing the congestion counter if the vehicle speed is greater than the high speed threshold;

providing an output signal commensurate with the occurrence of an incident if the count in the congestion counter exceeds a predetermined number;

clearing the congestion counter if an output signal commensurate with the occurrence of an incident is generated;

providing an output signal indicative of the absence of an incident when the count in the no congestion counter exceeds a predetermined number; and clearing the no congestion counter whenever an output signal indicative of the absence of an incident is generated.

14. The method of claim 13 wherein the step of illuminating comprises:

positioning a microwave transceiver such that microwave energy generated thereby will be transmitted as a beam having an axis which intersects the vehicle travel path within said region at a known angle.

15. The method of claim 14 wherein the step of illuminating further comprises:

focusing the emitted energy into a region lying within a single traffic lane.

16. The method of claim 15 wherein the step of further processing the received microwave energy additionally comprises:

comparing the time of succeeding half cycles of at least one of said phase-related signals of each said pair of phase-related signals to determine if the at least one signal has a duty cycle which is within a preselected range;

comparing the frequency of the signals of each said pair of phase-related signals; and determining speed only if the duty cycle is within a preselected range and if any difference in frequency is less than a preselected magnitude.

17. The method of claim 16 wherein said step of positioning the microwave transmitter comprises adjusting the beam axis such that it intersects the vehicle traffic path at an angle of 45°.

* * * * *